(12) United States Patent
Takano et al.

(10) Patent No.: US 6,788,669 B1
(45) Date of Patent: Sep. 7, 2004

(54) CDMA DEMODULATING APPARATUS AND METHOD AND CDMA MOBILE COMMUNICATION SYSTEM

(75) Inventors: Michiaki Takano, Tokyo (JP); Kazuaki Ishioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 808 days.

(21) Appl. No.: 09/696,180

(22) Filed: Oct. 26, 2000

Related U.S. Application Data

(63) Continuation of application No. PCT/JP99/00939, filed on Feb. 26, 1999.

(51) Int. Cl.[7] .............................................. H04B 7/216
(52) U.S. Cl. ...................................... 370/342; 370/320
(58) Field of Search ................................ 370/320, 342, 370/479; 375/147; 708/422

(56) References Cited

U.S. PATENT DOCUMENTS

| | | | | |
|---|---|---|---|---|
| 5,442,661 A | * | 8/1995 | Falconer ..................... | 370/479 |
| 5,764,690 A | * | 6/1998 | Blanchard et al. .......... | 375/147 |
| 5,894,473 A | * | 4/1999 | Dent ........................... | 370/342 |
| 5,931,893 A | * | 8/1999 | Dent et al. .................. | 708/422 |
| 6,339,612 B1 | * | 1/2002 | Stewart et al. .............. | 370/342 |
| 6,370,183 B1 | * | 4/2002 | Newson et al. ............. | 370/320 |
| 6,526,036 B1 | * | 2/2003 | Uchida et al. .............. | 370/342 |

FOREIGN PATENT DOCUMENTS

| | | |
|---|---|---|
| JP | 8-8780 | 1/1996 |
| JP | 9-261762 | 10/1997 |
| JP | 10-173630 | 6/1998 |
| JP | 10-178386 | 6/1998 |
| JP | 10-303855 | 11/1998 |

* cited by examiner

Primary Examiner—Salvatore Cangialosi
(74) Attorney, Agent, or Firm—Oblon, Spivak, McClelland, Maier & Neustadt, P.C.

(57) ABSTRACT

In a CDMA mobile communication system, upon occurrence of a call-connecting request, a mobile station sends a CDMA burst signal to a base station by random access. The base station detects de-spreading timing based on a correlation value between the CDMA burst signal and a reference code. Further, the base station delays the CDMA burst signal for a delay time equal to the time necessary for the detection of the timing. Upon detection of the de-spreading timing, the base station de-spreads the second-half portion of the CDMA burst signal from the midpoint to the end thereof, and at the same time, de-spreads the first-half portion of the delayed CDMA burst signal. By this, the demodulation time can be shorted as compared with that in the case of de-spreading the CDMA burst signal from its beginning to its end.

12 Claims, 10 Drawing Sheets

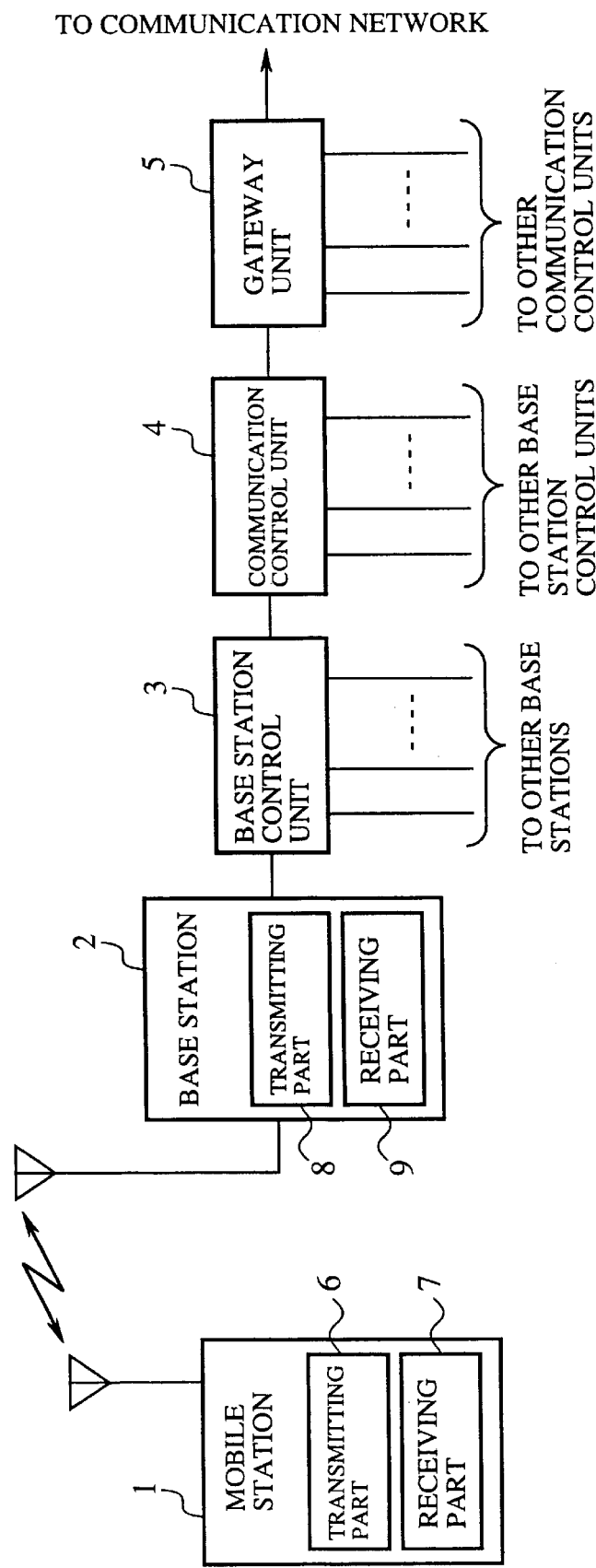

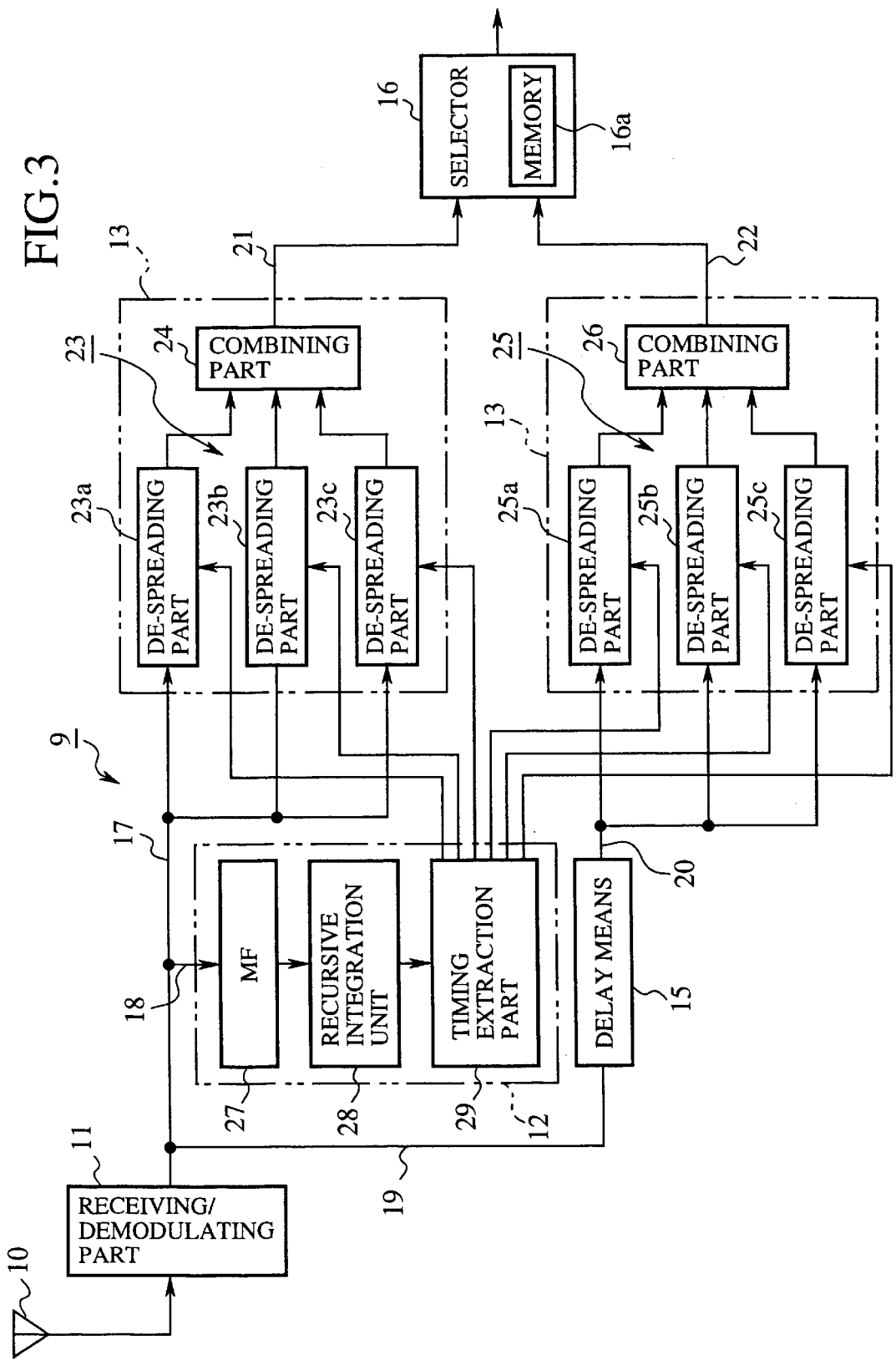

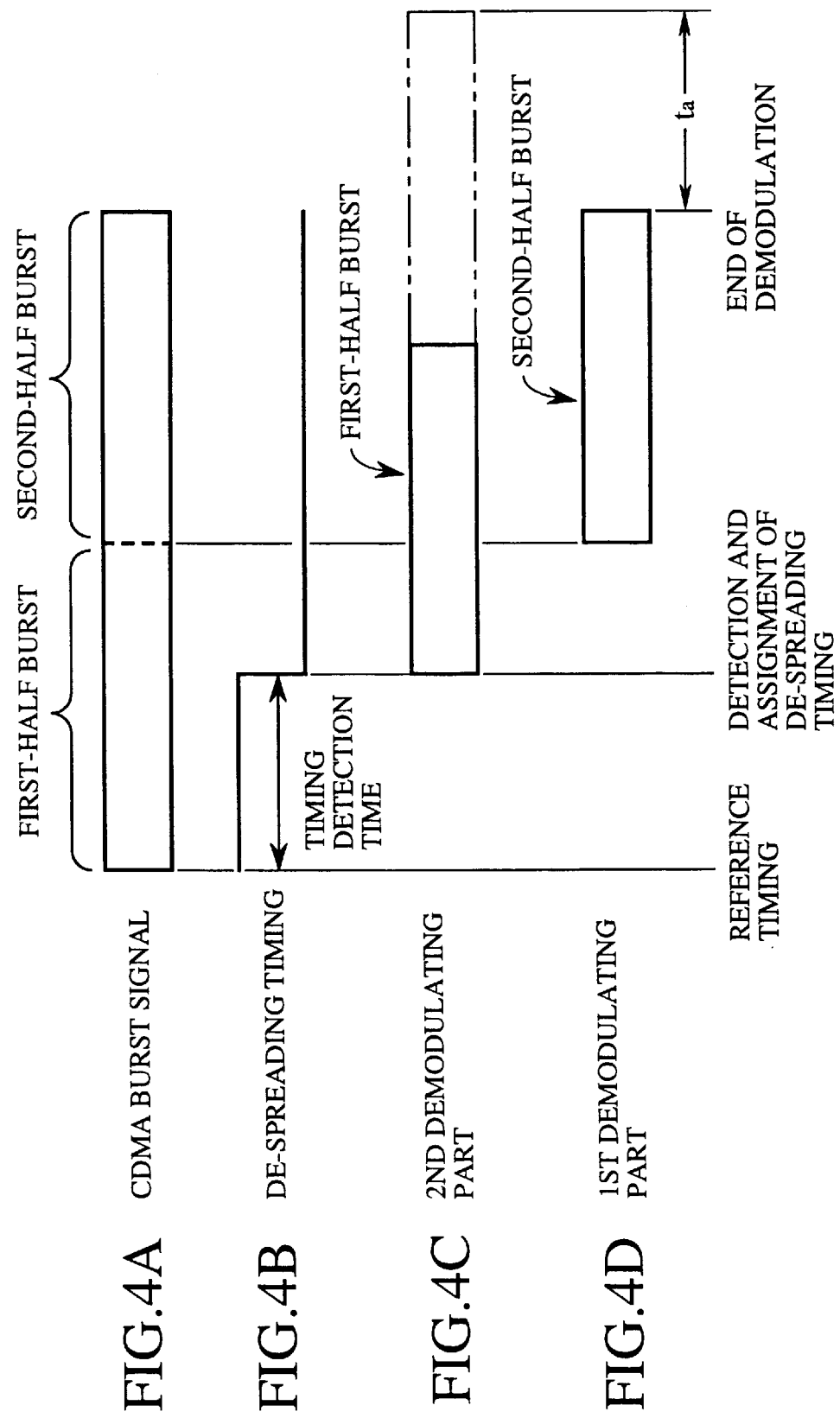

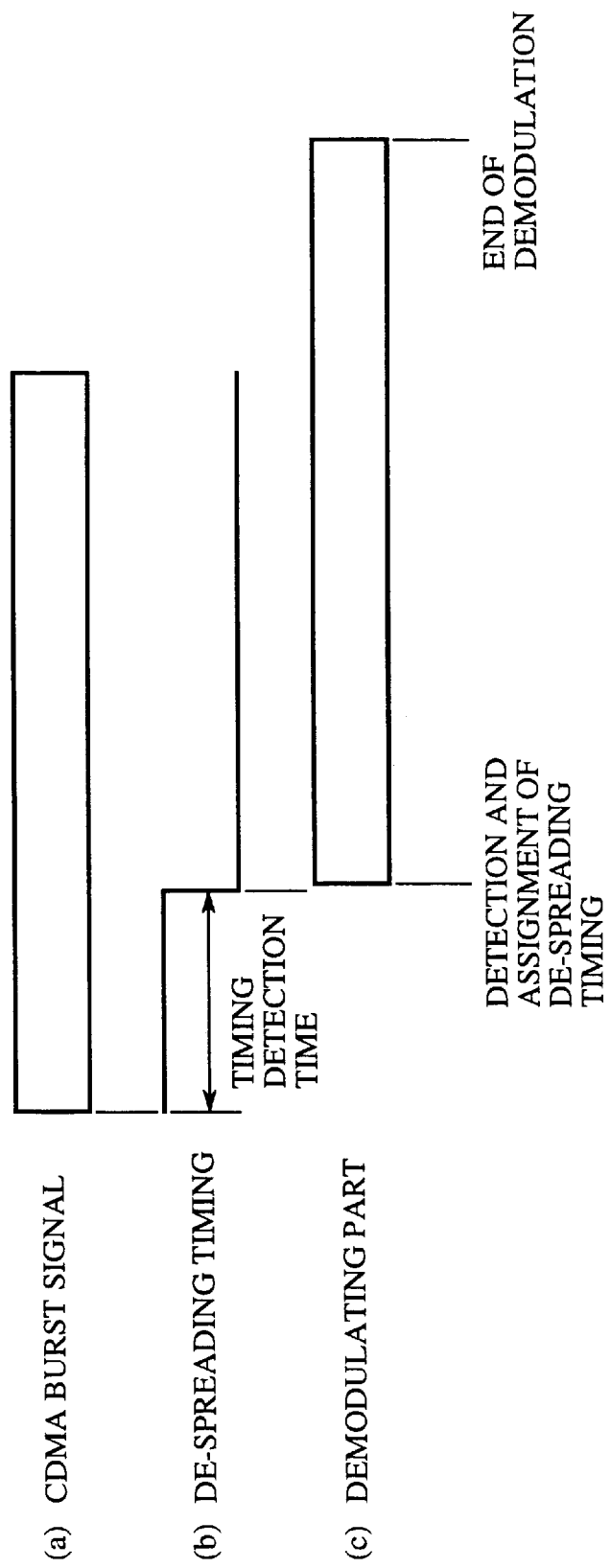

CDMA DEMODULATING APPARATUS AND METHOD AND CDMA MOBILE COMMUNICATION SYSTEM

CROSS-REFERENCE TO THE RELATED APPLICATION

This application is a continuation of International Application No. PCT/JP99/00939, whose International filing date is Feb. 26, 1999, the disclosures of which Application are incorporated by reference herein.

BACKGROUND OF THE INVENTION

1. Field of the Invention

The present invention relates to an apparatus and method that are used, for example, in a base station of a CDMA (Code Division Multiple Access) communication system to demodulate a CDMA burst signal transmitted burst-wise through random access, and the invention also pertains to a CDMA mobile communication system to which the CDMA demodulating apparatus is applied.

2. Description of the Related Art

Conventionally, a CDMA (Code Division Multiple Access) mobile communication system generally utilizes a random access scheme to establish calls between mobile and base stations. A CDMA receiving device that establishes a call by random access is disclosed, for example, in Japanese Pat. Appln. Laid-Open Gazette No. 178386/98.

FIG. 9 is a block diagram depicting the construction of the conventional CDMA receiving device exemplified in the above-said laid-open gazette. The illustrated CDMA receiving device is used, for instance, in a base station. Upon occurrence of a call, a mobile station sends a CDMA burst signal to the base station by random access. In this instance, the CDMA burst signal contains call-connecting request data and similar communication control data.

The CDMA receiving device in the base station converts the CDMA burst signal, received by an antenna 80, to a base-band type CDMA burst signal in a receiving/demodulating part 81. The receiving/demodulating part 81 provides the CDMA burst signal to a timing detecting part 82. Further, the receiving/demodulating part 81 provides the CDMA signal to a demodulating part 83 as well.

Based on the preamble of the CDMA burst signal provided from the receiving/demodulating part 81, the timing detecting part 82 computes each multipath delay profile. Then, based on the thus obtained delay profile, the timing detecting part 82 detects de-spreading timing for each path. The timing detecting part 82 indicates the thus detected de-spreading timing to each of de-spreading parts 84a, 84b and 84c.

The de-spreading parts 84a to 84c each de-spread the CDMA burst signal according to the de-spreading timing. As a result, demodulated signals are generated from plural CDMA burst signals sent over the multipath. The thus obtained demodulated signals are provided to a combining part 85. The combining part 85 performs maximal-ratio combining (RAKE combining) of the demodulated signals. In this way, an ultimate demodulated signal is obtained.

SUMMARY OF THE INVENTION

However, when assigned the de-spreading timing, the de-spreading parts 84a to 84c de-spread the CDMA (Code Division Multiple Access) burst signal from beginning to end as depicted in FIG. 10. Accordingly, de-spreading of all the CDMA burst signals takes a relatively large amount of time in excess of the entire burst length. That is, a relatively long demodulation time is required. On this account, a transfer delay of an acknowledge signal (ACK signal) that is an answer to the received CDMA burst signal occurs, causing a decrease in the circuit throughput. Hence, there is a fear of incurring a decrease in the channel capacity.

Therefore, an object of the present invention is to provide a CDMA demodulating apparatus and method that permit reduction of the time for demodulating the CDMA burst signal.

Another object of the present invention is to provide a CDMA mobile communication system that enables the channel capacity to be increased through the use of the above-said CDMA demodulating apparatus and method.

To attain the above objective, the present invention is to demodulate a CDMA burst signal sent by random access by: detecting de-spreading timing of the CDMA burst signal in a timing detection time, based on a correlation value between the CDMA burst signal and a reference code; delaying the CDMA burst signal for the timing detection time, and de-spreading, at the detected de-spreading timing, at least that second-half portion of a non-delayed CDMA burst signal which begins after the lapse of the timing detection time to generate a second-half demodulated signal, while at the same time de-spreading, at the detected de-spreading timing, that first-half portion of the delayed CDMA burst signal which extends from its beginning to the beginning of the second-half portion to generate a first-half demodulated signal; and selecting the first-half demodulated signal and the second-half demodulated signal in succession to obtain a demodulated signal corresponding to the whole CDMA burst signal.

According to the present invention, one CDMA burst signal is divided into first-half and second-half portions, which are de-spread in parallel to ultimately obtain a demodulated signal corresponding to the CDMA burst signal in its entirety. Hence, the demodulation time can be reduced as compared with that in the case of de-spreading CDMA burst signal portions one after another. Since this prevents a delay in the transmission of an acknowledge signal (ACK signal) that is an answer to the received CDMA burst signal, the circuit throughput can be increased. Accordingly, the application of the present invention, for example, to a CDMA mobile communication system increases the subscriber capacity of the system.

Further, the present invention is to demodulate a CDMA burst signal sent by random access by: detecting de-spreading timing of the CDMA burst signal, based on a correlation value between the CDMA burst signal and a reference code; delaying the CDMA burst signal for the timing detection time, and de-spreading, based on a first processing clock, at least that second-half portion of a non-delayed CDMA burst signal which begins after the lapse of the timing detection time to generate a second-half demodulated signal, while at the same time de-spreading, based on a second processing clock faster than the first processing clock, that first-half portion of the delayed CDMA burst signal which extends from its beginning to the beginning of the second-half portion to generate a first-half demodulated signal; and selecting the first-half demodulated signal and the second-half demodulated signal in succession to obtain a demodulated signal corresponding to the whole CDMA burst signal.

According to the present invention, the CDMA burst signal is divided into first-half and second-half portions, which are de-spread in parallel to ultimately obtain a demodulated signal corresponding to the CDMA burst signal in its entirety. Hence, the demodulation time can be reduced as compared with that in the case of obtaining a demodulated signal by de-spreading CDMA burst signal portions one after another at a relatively low, fixed speed. Since this prevents a delay in the transmission of an acknowledge signal (ACK signal) that is an answer to the received CDMA burst signal, the circuit throughput can be increased. Accordingly, the application of the present invention, for example, to a CDMA mobile communication system increases the subscriber capacity of the system.

BRIEF DESCRIPTION OF THE DRAWINGS

FIG. 1 is a conceptual diagram depicting the general configuration of a CDMA mobile communication system to which a CDMA demodulating apparatus according to a first embodiment of the present invention is applied;

FIG. 3 is a block diagram showing the configuration of a receiving part of a base station according to the first embodiment;

FIG. 4 is a timing chart for explaining the demodulation of the CDMA burst signal according to the first embodiment;

FIG. 10 is a timing chart for explaining a conventional CDMA burst signal demodulating process;

DETAILED DESCRIPTION OF THE PREFERRED EMBODIMENTS

Figure 2A:
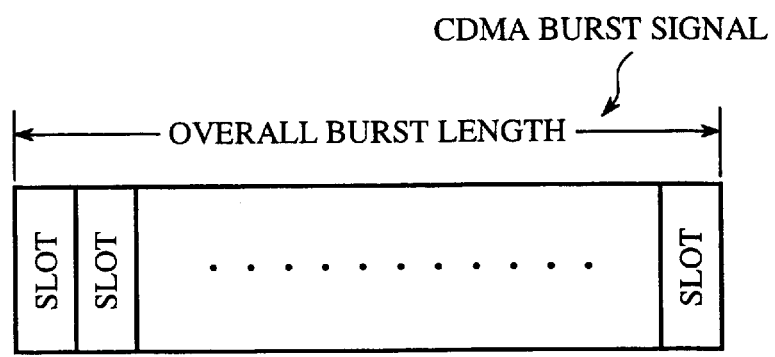
FIG. 2 is a diagram depicting the configuration of a CDMA burst signal.

A detailed description will be given, with reference to the accompanying drawings, of embodiments of the present invention.

Embodiment 1

FIG. 1 is a conceptual diagram illustrating the general configuration of a CDMA mobile communication system to which a CDMA (Code Division Multiple Access) demodulating apparatus or method according to a first embodiment (Embodiment 1) of the present invention is applied. This CDMA mobile communication system has a mobile station 1 and a base station 2, and implements mobile communications between the mobile station 1 and the base station 2 using a CDMA communication access system. The base station 2 is connected to an external communication network via a base station control unit 3, a communication control unit 4 and a gateway unit 4. The mobile station 1 is formed by a portable telephone, PHS (Personal Handyphone System) telephone or the like.

The mobile station 1 has a transmitting part 6 and a receiving part 7. The transmitting part 6 primary-modulates data by PSK (Phase Shift-Keying) or similar primary modulation techniques to obtain a primary-modulated signal. The transmitting part 6 performs de-spreading on the primary-modulated signal to multiply it by a reference code (PN (Pseudorandom Noise) Sequence), generating a spread spectrum CDMA signal. The transmitting part 6 sends the thus generated CDMA signal to the base station via an antenna.

The transmitting part 6 utilizes random access techniques such as slotted ALOHA in the case of sending a CDMA signal containing control data. Specifically, the transmitting part 6 selects any one of plural preset time offsets, and sends the CDMA signal burst-wise in synchronization with the selected time offset. In this instance, the CDMA signal contains communication control data such as call-connecting request data. In the following description, the CDMA signal that is sent for one time offset will be referred to as a CDMA burst signal.

Figure 2B:
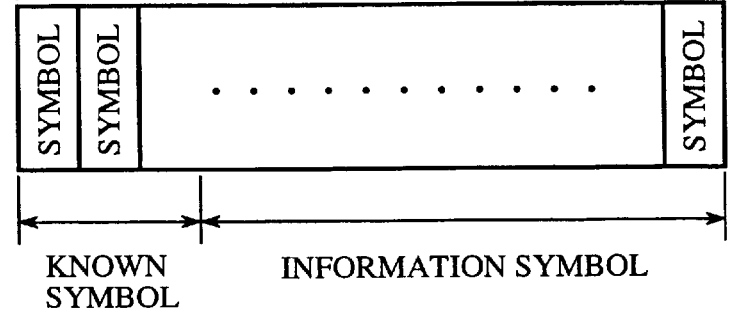

The CDMA burst signal comprises plural (16, for instance) slots as depicted in FIG. 2. Each slot comprises plural (40, for instance) symbols. Each symbol comprises a chip sequence consisting of plural (64, for instance) reference codes. The overall burst length is, for example, 10 ms.

The plural symbols that are contained in each slot fall into known symbols and information symbols. The known symbols correspond to, for example, the preamble composed of plural symbols, have a length, for example, equal to a quarter of one slot. Each known symbol is composed of plural chip sequence of a known pattern. The information symbols correspond to the main body of data composed of plural symbols, and have a length, for example, equal to three-fourth of one slot.

Turning back to FIG. 1, the receiving part 7 receives a CDMA signal sent from the base station 2, and de-spreads the CDMA signal, reconstructing a primary-modulated signal. The receiving part 7 performs primary demodulation, which is inverse processing to the primary modulation, on the thus reconstructed primary-modulated signal, thereby ultimately reconstituting the original data.

The base station 2 has a transmitting part 8 and a receiving part 9. The transmitting part 8 generates a primary-modulated signal, then generates a CDMA signal, and sends the CDMA signal to the mobile station 1. The receiving part 9 receives a CDMA signal (a burst signal) sent from the mobile station 1, and reconstructs the original data from the received CDMA signal. The CDMA signal from the mobile station 1 is usually sent over plural paths. Hence, the receiving part 9 reconstructs the data with high quality through utilization of maximum ratio combining (RAKE combining) techniques.

FIG. 3 is a block diagram depicting the configuration of the receiving part 9. Upon receiving the CDMA burst signal during random access, the receiving part 9 de-spreads two different partial bursts of the received CDMA signal in parallel in accordance with its de-spreading timing, thereby generating demodulated signals that correspond to the respective parts. Following this, the receiving part 9 sequentially selects these demodulated signals, starting at the beginning of the CDMA burst signal. In this way, a demodulated signal corresponding to the CDMA burst signal in its entirety is obtained.

More specifically, the receiving part 9 delays the CDMA burst signal for at least the period of detecting the de-spreading timing of the CDMA burst signal, and applies the delayed CDMA burst signal and the non-delayed CDMA signal to different demodulating parts. After the detection of the de-spreading timing, the receiving part 9 de-spreads, in the different demodulating parts, the first half burst (½) of the CDMA burst signal to generate a first-half demodulated signal, and de-spreads the second half burst (½) of the CDMA burst signal to generate a second-half demodulated signal. Thereafter, the receiving part 9 selects the first-half demodulated signal and, upon completion of the selection, selects the second-half demodulated signal in succession to the first-half demodulated signal. In this way, the demodulated signal corresponding to the entire CDMA burst signal is obtained.

More specifically, the receiving part 9 has an antenna 10, a receiving/demodulating part 11, a timing detecting part 12, a first demodulating part 13, a second demodulating part 14, a delay means 15 and a selector 16. The first demodulating part 13 is connected via a line 17 to the receiving/demodulating part 11. The timing detecting part 12 is connected to the receiving/demodulating part 11 via a branch line 18 branched from the line 17.

The delay means 15 is connected to the receiving/demodulating part 11 via a branch line 19 branched from the line 17 at a point preceding the branch line 11. The second demodulating part 14 is connected via a line 20 to the delay means 15. The selector 16 is connected to the first demodulating part 13 and the second demodulating part 14 via lines 21 and 22, respectively.

Incidentally, the first and second demodulating parts 13 and 14 in this Embodiment 1 respectively correspond to a first de-spreading means and a second de-spreading means in claim 1.

The receiving/demodulating part 11 performs frequency modulation and A/D (Analog/Digital) conversion of the CDMA burst signal received by the antenna 10, creating a base-band type CDMA burst signal. The receiving/demodulating part 11 provided the thus created CDMA burst signal to the timing detecting part 12, the delay means 15 and the first demodulating part 13.

Based on the correlation value between the CDMA burst signal and the reference code, the timing detecting part 12 extracts, over a timing extracting period, the timing for de-spreading the CDMA burst signals respectively corresponding to plural paths. The timing extracting period corresponds to an averaging time long enough to detect the peak of the correlation value. Further, the timing detecting part 12 assigns the detected de-spreading timing to each the first and second demodulating parts 13 and 14.

The timing detection period, which is the sum of the timing extracting and timing assignment times, is a known value. In this Embodiment 1 the timing detection period is set to a time interval longer than ¼ of the entire burst length but shorter than ½ of the entire burst length. Here, the beginning of the second-half burst set at the midpoint of the entire burst length. That is, the beginning of the second-half burst is set at a point in time after the lapse of the timing detection time.

The first demodulating part 13 is to demodulate the CDMA burst signal from halfway. That is, the first demodulating part 13 demodulated the second-half burst of the CDMA burst signal. The first demodulating part 13 comprises plural first de-spreading parts 23a, 23b and 23c (hereinafter referred to generically as a "first de-spreading part 23" as required) and a first combining part 24. The number of first de-spreading parts 23 used is 3. They are used to de-spread the CDMA burst signals sent over different paths.

The first de-spreading part 23 has a reference code generating part (not shown). The first de-spreading part 23 generates a reference code in the reference code generating part with the de-spreading timing assigned from the timing detection part 12. The first de-spreading part 23 uses the reference code by the reference code generating part to de-spread the second-half burst, thereby reconstructing the primary-modulated signal.

Further, the first de-spreading part 23 performs channel estimation processing on the reconstructed primary-modulated signal, and executes synchronous detection processing through utilization of the channel estimation output. In this way, the first de-spreading part 23 obtains a phase-compensated second-half demodulated signal.

The first combining part 24 combines second-half demodulated signals that are output from the plural first de-spreading parts 23a to 23c. That is, since the first de-spreading parts 23a to 23b are each provided for one path, the first combining part 24 performs maximum ratio combining (RAKE combining) of the second-half demodulated signals. The second-half demodulated signal that is output from the first combining part 24 is provided as the output from the first demodulating part 13 to the selector 16.

The delay means 15 delays the CDMA burst signal from the receiving/demodulating part 11 for a predetermined delay time, and then provides the delayed signal to the second demodulating part 14. The above-mentioned delay time is set to a value equal to the above-mentioned timing detection period and is a fixed value. This prevents the CDMA burst signal from being applied to the second demodulating part 14 before the de-spreading timing is detected and assigned.

The second demodulating par 14 demodulates the CDMA burst signal delayed by the delay means 15 from beginning. That is, the second demodulating part 14 demodulates the first-half burst of the CDMA burst signal. The second demodulating part 14 comprises plural (three) second de-spreading parts 25a, 25b and 25c (hereinafter referred to generically as a "second de-spreading parts 25" as required) and a second combining part 26.

The second de-spreading part 25 de-spreads the first-half burst through utilization of a reference code to reconstruct the primary-modulated signal and performs channel estimation and synchronous detection processing, thereby obtaining a first-half demodulated signal. And the second combining part 26 performs RAKE combining of first-half demodulated signals that are output from the second de-spreading parts 25a to 25c. The first-half demodulated signal that is output from the second combining part 26 is provided as the output from the second demodulating part 14 to the selector 16.

The selector 16 selectively outputs therethrough the second-half demodulated signal and the first-half demodulated signal that are output from the first and second demodulating parts 13 and 14, respectively. In concrete terms, the selector 16 outputs the first-half demodulated signal and, in response to its completion, outputs the second-half demodulated signal in succession to the first-half demodulated signal.

More specifically, the selector 16 is provided with a memory 16a. The selector 16 temporarily holds the first-half demodulated signal and the second-half demodulated signal in the memory 16a. The selector 16 reads out the first-half demodulated signal held in the memory 16a and outputs it, and in response to its completion, reads out and outputs the second-half demodulated signal in succession to the first-half demodulated signal. In this way, the selector 16 can output the demodulated signal in perfect form. The demodulated signal in perfect form is provided, for instance, to a decision part contained in an external DSP (Digital Signal processor), wherein it is converted to the original data.

FIG. 4 is a schematic diagram for explaining in more detail the de-spreading process in the receiving part 9. FIG. 4(a) shows the received CDMA burst signal. In this case, for convenience sake, the CDMA burst signal is assumed to be received with reference timing. FIG. 4(b) shows that the de-spreading timing is detected and assigned upon completion of the timing detection period FIG. 4(c) shows the first-half burst that is demodulated in the second demodulating part 14. FIG. 4(d) shows the second-half burst that is demodulated in the first demodulating part 13.

The CDMA burst signal, received at the reference timing during random access, is fed via the line 17 to each of the first de-spreading parts 23a to 23c of the first demodulating part 13. This CDMA burst signal is also provided via the branch line 19 to the delay means 15 and is held in the delay means 15.

The CDMA burst signal fed to the first demodulating part 13 side is provided via the branch line 18 to the timing detecting part 12. The timing detecting part 12 detects the de-spreading timing in the timing detection period as depicted in FIG. 4(b), and assigns the detected de-spreading timing to the first and second demodulating parts 13 and 14.

Since the delay time of the delay means 15 is equal to the timing detection period, the delay means 15, when assigned the de-spreading timing, immediately provides the CDMA burst signal to each of the second de-spreading parts 25a to 25c of the second demodulating part 14. The second de-spreading parts 25a to 25b each begin to de-spread the CDMA burst signal at the start thereof with the assigned de-spreading timing as depicted in FIG. 4(c). At this time, the second demodulating part 14 de-spreads the first-half burst from the start of the CDMA burst signal to the midpoint of the entire burst length as shown in FIG. 4(d), and then performs synchronous detection and RAKE combining, thereby generating a first-half demodulated signal.

On the other hand, the first demodulating part 13 decides whether the time one half that of the entire burst length has lapsed after the timing when the CDMA burst signal was received. More specifically, in the FIG. 4 example, since the CDMA burst signal is assumed to be received with the reference timing, it is decided whether the time one half that of the entire burst length has lapsed after the reference timing.

Incidentally, the CDMA burst signal may sometimes be received after the reference timing. In such an instance, since the receiving timing can be detected by the timing detection part 12, the receiving timing concerned can be used as a reference to decide whether the time one half that of the entire burst length has lapsed.

Upon detecting the lapse of the time one half that of the entire burst length after the reference timing, the first demodulating part 13 de-spreads the second-half burst from the midpoint of the CDMA burst signal to the end thereof as depicted in FIG. 4(d), and then performs synchronous detection and RAKE combining processes, thereby generating a second-half demodulated signal.

The selector 16 holds in the memory 16a the first-half demodulated signal and the second-half demodulated signal fed from the second demodulating part 14 and the first demodulating part 13, respectively. Upon completion of inputting the second-half demodulated signal into the memory 16a, the sector 16 begins to read out therefrom the first-half demodulated signal. Further, upon completion of the readout of the first-half demodulated signal, the selector 16 begins to read out the second-half demodulated signal in succession to the first-half demodulated signal. In this way, the selector 1 outputs the demodulated signal corresponding to the CDMA burst signal in its entirety.

As described above, the receiving part 9 divides the CDMA burst signal into first-half/second-half burst, and demodulates them in parallel. Accordingly, the demodulating time can be reduced by a predetermined time ta as compared with as indicated by the two-dot chain lines in FIG. 4(c), the demodulating time can be reduced by a predetermined time ta as compared with the time needed for demodulating the CDMA burst signal from beginning to end at one time. Accordingly, the demodulation of the next CDMA burst signal can be started quickly.

Incidentally, the processing clock on which the selective output processing in the selector 16 may also be set sufficiently faster than processing clocks in first and second demodulating parts 40. With such an arrangement, it is possible to finish the outputting of the second-half demodulated signal from the selector 16 well before the start of the demodulation of the next CDMA burst signal.

Turning back to FIG. 3, the configuration of the timing detection part 12 will be described in more detail. The timing detection part 12 comprises a matched filter (MF) 27, a recursive integration part 28 and a timing extraction part 29.

The matched filter 27 uses a reference code to perform correlation processing on the CDMA signal to obtain correlation values corresponding to respective symbols of the CDMA burst signal. The recursive integration part 28 averages the correlation values from the matched filter 27 by recursively integrating them power-wise. The timing extraction part 29 extracts the de-spreading timing for each path based on the correlation value averaged by the recursive integration part 28.

The configuration of the timing detection part 12 will be described in more detail. The matched filter 27 stores the CDMA burst signal in a shift register corresponding to an observation window upon each A/D sampling. The observation window is set based on the maximum time that is necessary for the base station 2 to receive an answer signal to a control signal after the reference timing of sending the control signal from the base station 2. That is, the observation window is a value that is set in dependence on the cell radius. For instance, when the cell radius is 10 (km), the observation window is set to about 66.7 $\mu$m, taking into account uplink/downlink propagation delays.

The matched filter 27 computes the sum total of the results of multiplications of CDMA burst signal stored in this shift register and reference codes stored on a chip-wise basis in another shift register, and outputs the sum total as a correlation value. The matched filter 17 multiplies the reference codes by the CDMA burst signal stored in the shift register while shifting the signal chip by chip, and adds the multiplication results one after another. As a result, when plural symbols forming known symbols are stored in the shift register in a sequential order with the first symbol at its first storage position, a value of high correlation is obtained.

Incidentally, the circuit for detecting the correlation value may also be, for instance, an integrating discharge circuit as a substitute for the matched filter 27.

The correlation value that is obtained by one round of processing in the matched filter 27 contains many noise components. Then, in the recursive integration part 28 correlation values are averaged through power-wise recursive integration to isolate a peak from the noise components. More specifically, the recursive integration part 28 handles only the first four slots of the CDMA burst signal; that is, it recursively integrates correlation values for the four slots power-wise. In this way, it is possible to obtain the correlation value with the peak standing out.

The timing extraction part 29 computes the propagation delay time of respective paths based on the correlation values that are output from the recursive integration part 28. Specifically, the timing extraction part 29 compares the correlation values and a predetermined threshold value to obtain a correlation value larger than the threshold value. Thus, the peak position can be detected. Then, the timing extraction part 29 computes the time from the reference timing to the peak. The time from the reference timing to the peak corresponds to the propagation delay time of each path. In this way, the timing extraction part 29 extracts the de-spreading timing for each path.

By the way, an observation window is set in the detection of the de-spreading timing as referred to above. Some of the incoming CDMA burst signals are received toward the beginning of the observation window and some toward the end. Since the demodulation is started in synchronization with the receiving timing, a maximum time difference corresponding to the observation window arises among demodulated CDMA burst signals of all paths.

In view of the above, the first and second combining parts 24 and 26 are adapted to perform the RAKE combining process when the time corresponding to the observation window has passed after the reception of a demodulated signal of an arbitrary path. Accordingly, the time between the reference timing and the outputting from the first and second demodulating parts 13 and 13 is the sum of the timing detection time, the observation window and the demodulating time. Embodiment 1 reduces the demodulating time, and consequently decreases the overall processing time.

As described above, according to Embodiment 1, one CDMA burst signal is split into first/second halves, which are demodulated in parallel in the different demodulating parts 13 and 14, respectively. Accordingly, the time for completion of demodulation can be reduced. Hence, the demodulation of the next CDMA burst signal can be started quickly.

It is possible, therefore, to suppress a transmission delay of an acknowledge signal (ACK signal) that is an answer to the received CDMA burst signal, providing enhanced throughput of the circuit. Hence, at the time of random access, in particular, at the time of requesting the connection of a call, the channel capacity of the CDMA mobile communication system concerned can be increased. This makes it possible to increase the subscriber capacity of the CDMA mobile communication system concerned.

Embodiment 2

Figure 5:
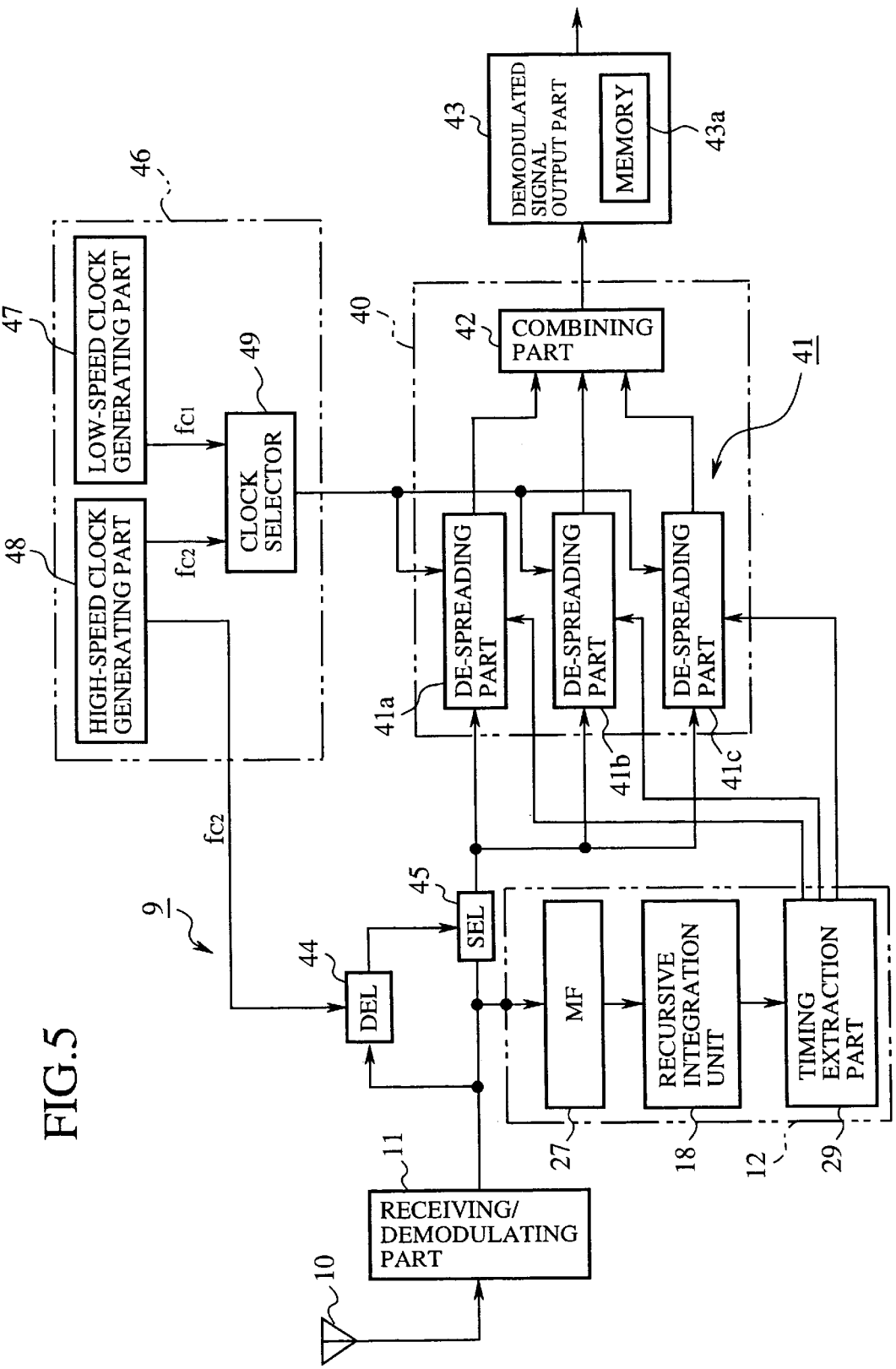
FIG. 5 is a block diagram showing the configuration of a receiving part of a base station to which a CDMA demodulating apparatus according to a second embodiment of the present invention is applied.

FIG. 5 is a block diagram illustrating the configuration of the receiving part 9 of the base station 2 according to a second embodiment (Embodiment 2) of the present invention. In FIG. 5 the functional parts corresponding to those in FIG. 3 are identified by the same reference numerals.

In Embodiment 1 described above, the demodulation system is divided into two routes by the first and second demodulating parts 13 and 14, wherein the first-half/second-half bursts of the CDMA burst signal are de-spread in parallel to speed up the demodulation. On the other hand, Embodiment 2 uses one demodulating system, wherein the first-half burst, which cannot be demodulated in real time due to the timing detection, is de-spread at high speed afterward to thereby speed up the demodulation.

More specifically, the receiving part 9 according to Embodiment 2 is provided with one demodulating part 40. The demodulating part 40 comprises plural de-spreading parts 41, 41*b* and 41*c* (hereinafter referred to generically as A "dispreading part 41" as required) and a combining part 42. The de-spreading part 41 performs, as in Embodiment 1, de-spreading, channel estimation and synchronous detection processing on the CDMA burst signal to obtain its demodulated signal. The function of the combining part 42 is to RAKE-combine the demodulated signals that are output from the plural de-spreading parts 41*a* to 41*c* as in Embodiment 1.

The receiving part 9 is further provided with demodulated signal output part 43. The demodulated signal output part 43 has a memory 43*a*. The memory 43*a* is to temporarily store first-half and second-half demodulated signals that are output from the demodulating part 40. The demodulated signal output part 43 sequentially reads out respective demodulated signals stored in the memory 43*a* and outputs them in the order of their first-half and second-half portions.

The receiving part 9 is further provided with a delay means (DEL) 44. The delay means 44 is formed by a FIFO (First In First Out) memory, for instance. The delay means 44 is inserted between the receiving/demodulating part 11 and the demodulating part 40 just like a bypass. The delay means 44 delays the CDMA burst signal from the receiving/demodulating part 11 for a predetermined delay time. The delay time is set to a value equal to the burst length, for instance.

The receiving part 9 is further provided with a signal selector (SEL) 45. The signal selector 45 is to switch the signal that is fed to the demodulating part 40. Specifically, the signal selector 45 receives the output from the delay means 44 and the output from the receiving/demodulating part 11, and provides either one of them to the demodulating part 40.

Moreover, the receiving part 9 is provided with a clock control part 46. The clock control part 46 controls mainly processing clocks for the de-spreading part 41 and the delay means 44 in the demodulating part 40. More specifically, the clock control part 46 has a low-speed clock generating part 47 and a high-speed clock generating part 47. The low-speed clock generating part 47 generates a low-speed clock fc1 that is a first processing clock. The high-speed clock generating part 47 generates a high-speed processing clock fc2 that is a second processing clock fc2 faster than the low-speed cloak fc1.

The clock control part 46 is further provided with a clock selector 49. The clock selector 49 is supplied with the low-speed clock fc1 and the high-speed clock fc2 that are generated in the low-speed and high-speed clock generating parts 46 and 47, respectively, and provides either one of them to the demodulating part 40.

Figure 6:
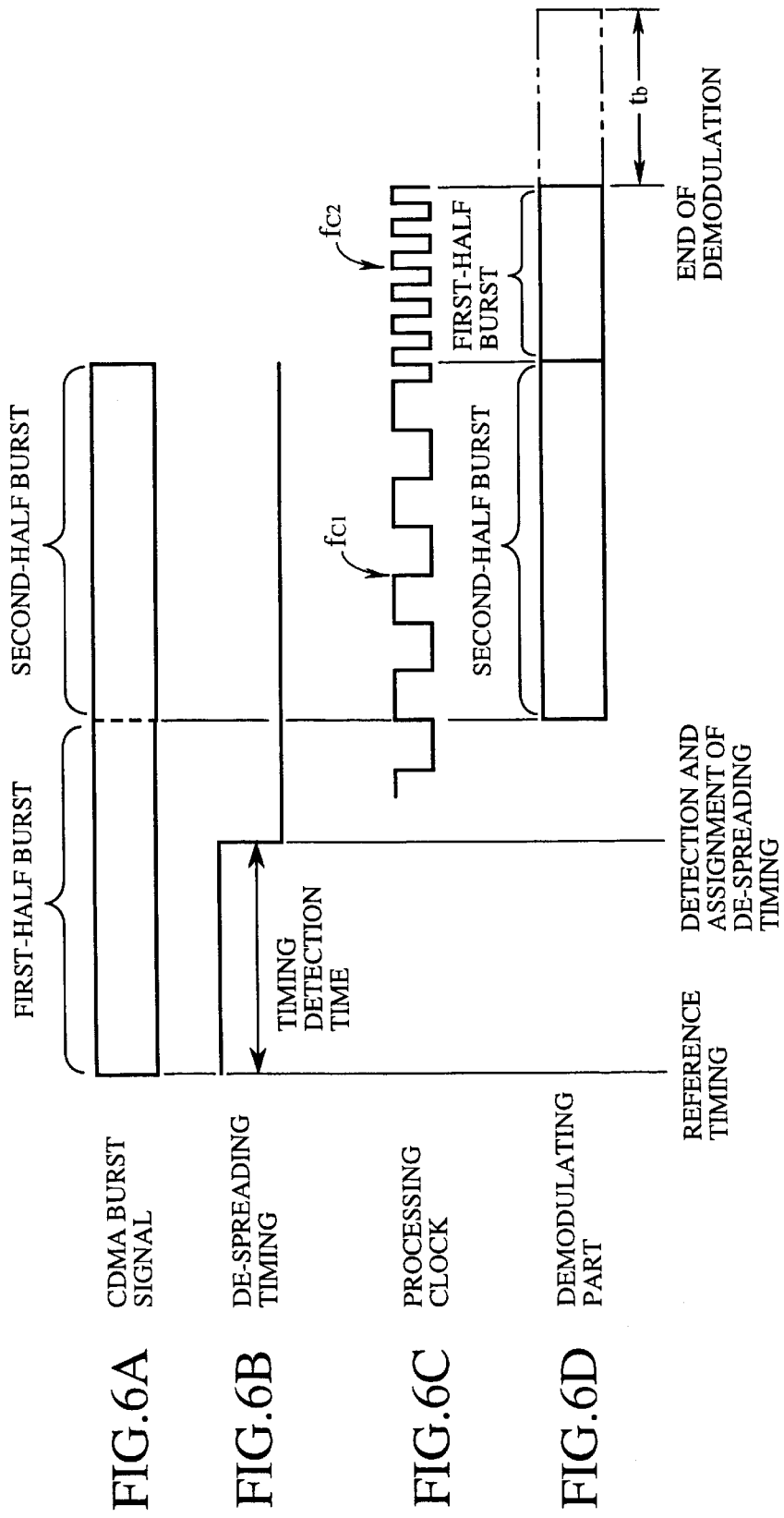
FIG. 6 is a timing chart for explaining the demodulation of a CDMA burst signal according to the second embodiment.

FIG. 6 is a timing chart for explaining the demodulation process in the receiving part 9 according to Embodiment 2. FIG. 6(*a*) shows a CDMA burst signal. FIG. 6(*b*) shows that after the lapse of the timing detection time, the de-spreading timing is detected and assigned. FIG. 6(*c*) shows the processing clocks. FIG. 6(*d*) shows the CDMA burst signal that is demodulated in the demodulating part 40.

Before receiving the CDMA burst signal, the signal selector 45 is selecting the output from the receiving/ demodulating part 11. And the clock selector 49 is selecting the low-speed clock fc1.

In such a state, the CDMA burst signal received at the reference timing during random access is provided to the demodulating part 40, the timing detection part 12 and the delay means 44. When the de-spreading timing is assigned to the demodulating part 40 after the lapse of the timing detection time, the demodulating part 40 starts de-spreading of the CDMA burst signal provided from the receiving/demodulating part 11.

In this instance, the demodulating part 40 decides whether the time one half that of the entire burst length has passed after the reference timing. When the time one half that of the entire burst length has passed after the reference timing, the demodulating part 40 begins to de-spread the second-half burst of the CDMA burst signal. In this case, since the low-speed clock fc1 is being selected, the de-spreading process is performed at a relatively low speed. The demodulating part 40 supplies the demodulated signal output part 43 with the second-half demodulated signal obtained by the de-spreading. The demodulated signal output part 43 stores the second-half demodulated signal in the memory 43a.

Upon completion of the de-spreading of the second-half burst, the clock selector 49 switches the low-speed clock fc1 to the high-speed clock fc2. And the signal selector 45 selects the output of the delay means 44 from the outputs of the receiving/demodulating part 11. Since the high-speed clock fc2 is being selected, the CDMA burst signal delayed according to the high-speed clock fc2 is read out of the delay means 44 at high speed and is applied to the demodulating part 40. In this way, the CDMA burst signal is provided to the demodulating part 40 without delay upon completion of the demodulation of the second-half burst.

Moreover, the demodulating part 40 de-spreads the input CDMA burst signal according to the high-speed clock fc2. At this time, since the CDMA burst signal is input thereto from the delay means 44, the demodulating part 40 de-spreads the first-half burst of the CDMA burst signal.

In addition, this de-spreading is carried out following the high-speed clock fc2. Accordingly, the first-half burst can be de-spread faster than in the case where it is de-spread following the low-speed clock fc1. In concrete terms, as indicated by the two-dot chain line in FIG. 6(d), the time until the completion of demodulation can be made shorter by a predetermined time ta than in the case of de-spreading the first-half burst according to the low-speed clock fc1 in common with the second-half burst. The demodulating part 40 supplies the demodulating signal output part 43 with the first-half demodulated signal obtained by the de-spreading.

The demodulated signal output part 43 stores the first-half demodulated signal in the memory 43a. Then, the demodulating output part 43 reads out the first-half demodulated signal from the memory 43a and outputs it. Following this, upon completion of the outputting the first-half demodulated signal, the demodulated signal output part 43 reads out the previously stored second-half demodulated signal from the memory 43a, and outputs it in succession to the first-half demodulated signal. In this way, a demodulated signal in a complete state is output.

In this case, too, it is a matter of course to use the high-speed clock for the readout operation as referred to previously in connection with Embodiment 1.

As described above, according to Embodiment 2, the CDMA burst signal is delayed, and in one demodulating part 40 the second-half burst of the CDMA burst signal is demodulated and, upon completion of the demodulation, the first-half burst of the delayed CDMA burst signal is demodulated at high speed.

Accordingly, the time until the end of demodulation can be reduced as compared with that needed in the case of demodulating the CDMA burst signal from the beginning to the end thereof at the same processing speed. This suppresses the transmission delay of the ACK signal, providing enhanced throughput of the circuit. Hence, the channel capacity of the CDMA mobile communication system concerned can be increased during random access, in particular, at the time of making a call connection request. As a result, the subscriber capacity-of the CDMA mobile communication system concerned can be increased.

Further, the receiving part 9 reads out the CDMA burst signal from the delay means 44 under the control of the high-speed clock fc2. Accordingly, the demodulation time can be shortened as compared with that in the case of reading out the CDMA signal based on the low-speed clock fc1.

Embodiment 3

Figure 7:
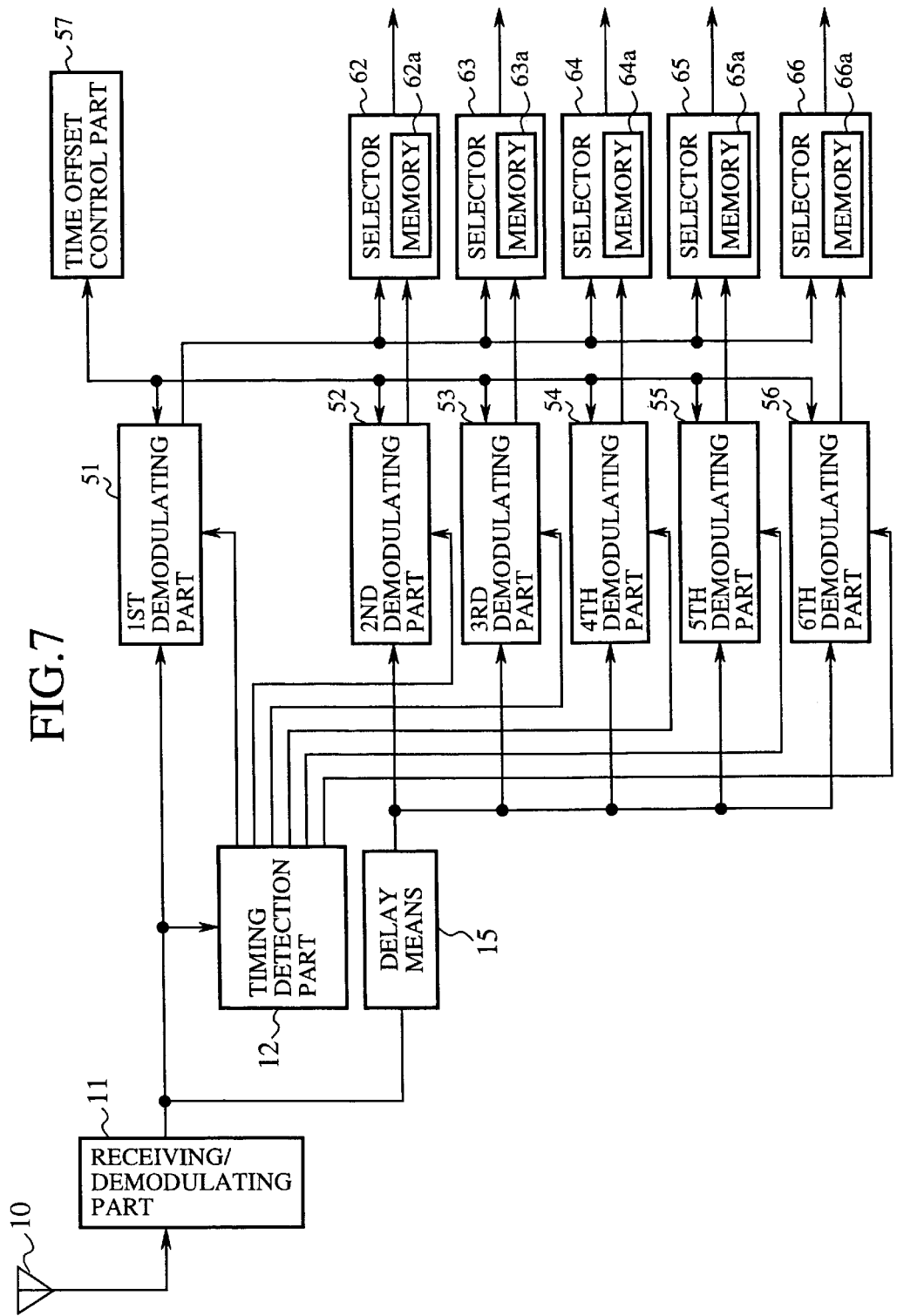
FIG. 7 is a block diagram showing the configuration of a receiving part of a base station to which a CDMA demodulating apparatus according to a third embodiment of the present invention is applied.

FIG. 7 is a block diagram illustrating the configuration of the receiving part 9 of the base station 2 according to a third embodiment (Embodiment 3) of the present invention. In FIG. 7 the same functional parts as those in FIG. 3 are identified by the same reference numerals.

Embodiments 1 and 2 have been described to receive the CDMA burst signal sent from one mobile station 1. During random access, however, plural mobile stations 1 sends CDMA burst signals to the base station 2. In this instance, the receiving part 9 of the base station 2 needs to discriminate the CDMA burst signal for each mobile station 1 prior to its demodulation. Embodiment 3 is intended to provide a receiving part 9 that permits reduction of the time for demodulation of respective CDMA burst signals from plural mobile stations 1 but is small in the scale of hardware.

Figure 8:
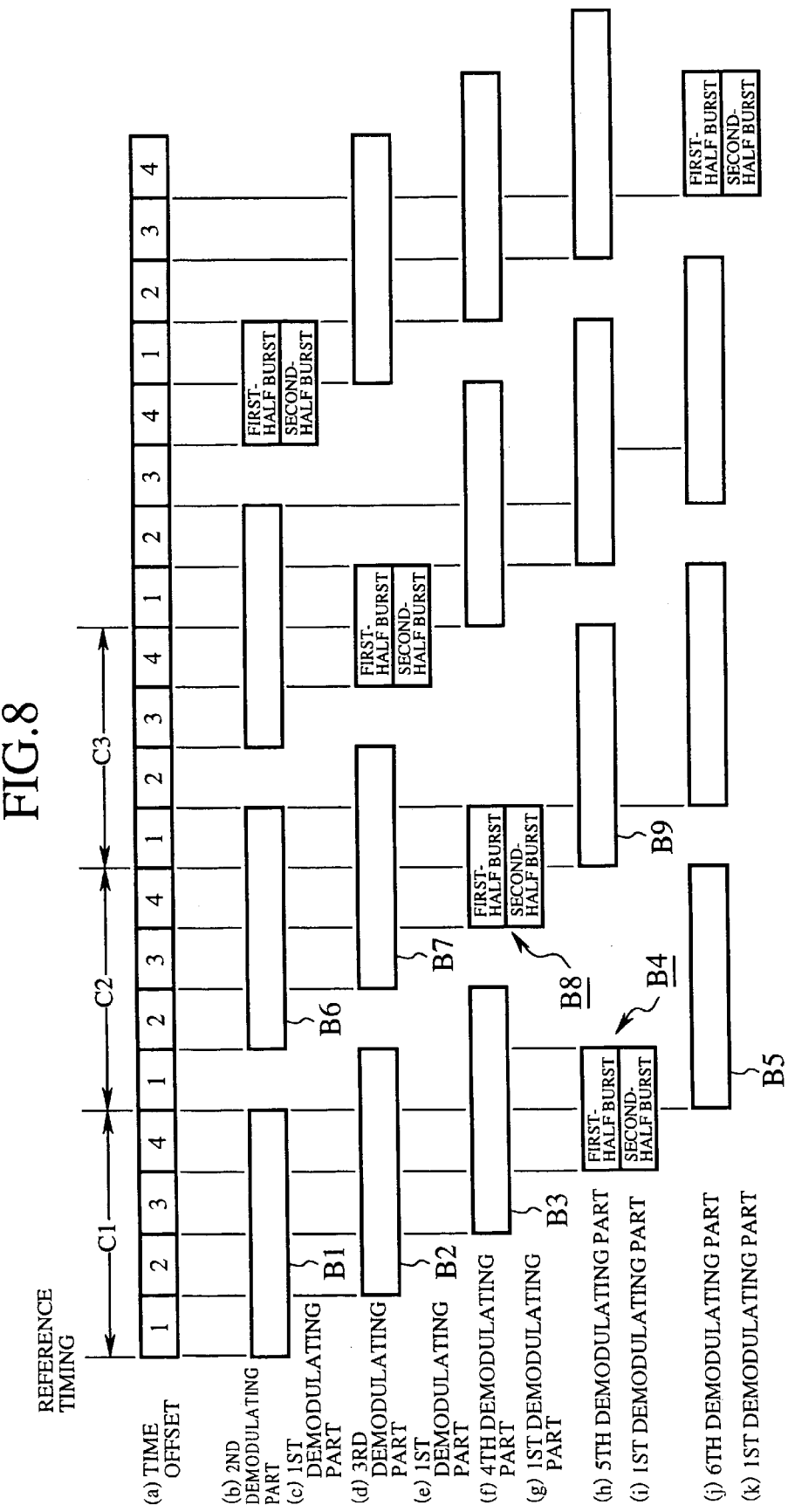
FIG. 8 is a timing chart for explaining the demodulation of a CDMA burst signal according to the third embodiment.
Figure 9:
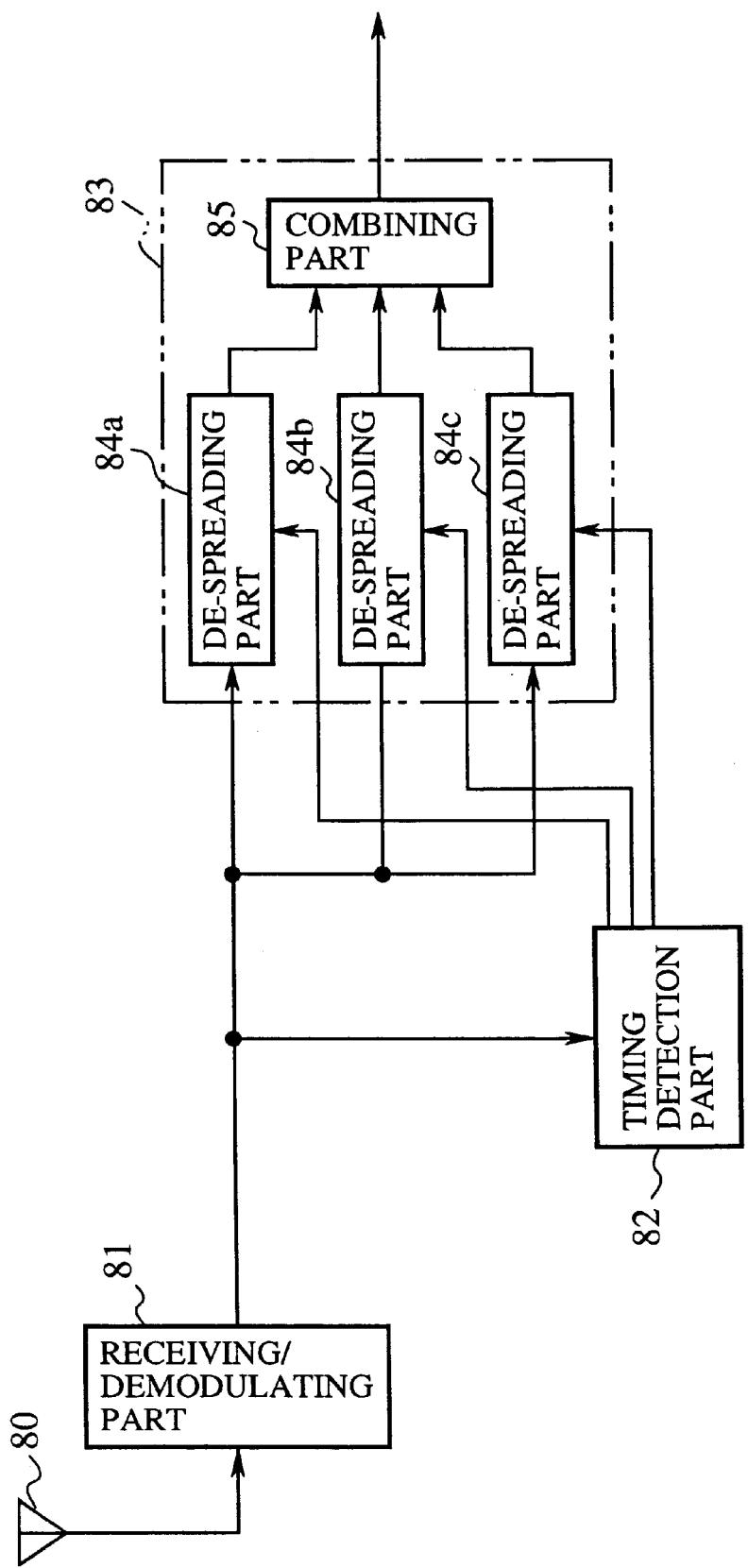
FIG. 9 is a block diagram depicting the configuration of a conventional CDMA demodulating apparatus.

This embodiment will be described below in more detail. A description will be given first of time offset. FIG. 8 is a diagram for explaining time offset. The receiving parts 9 has set therein four time offsets #1, #2, #3 and #4, and periodically repeats them to perform demodulation or the like. The beginning of the time offset #1 coincides with the reference timing of the base station 2.

The base station 2 sends a control signal to the mobile station 1 after indicating thereto any one of the four time offsets #1, #2, #3 and #4. In this case, the base station 2 assigns a different time offset in one period to a different mobile station 2. The mobile station 1 uses the indicated time offset to send an answer signal in reply to the control signal. Accordingly, the CDMA burst signal that is sent with a different time offset in one period is an answer signal from a different mobile station 1.

The interval between the time offsets is set to a time equal to or longer than at least an observation window so as to ensure discrimination of different CDMA burst signals in the base station 2. The observation window is set based on the maximum time needed to receive the answer signal after the reference timing. Accordingly, in the base station 2 CDMA burst signals received in the observation window are regarded as identical and are processed accordingly. In order for the base station 2 to distinguish between different CDMA burst signals, it is necessary to set the interval between the time offsets to a time at least longer than the observation window. In Embodiment 3 the interval between the time offsets is set to a time corresponding to a quarter of the overall burst length.

As described above, the plural mobile stations 1 send CDMA burst signals in different time offsets. Accordingly, in the case where the base station 2 demodulates the plural different CDMA burst signals after discriminating them, it needs only to use one demodulating part for each time offset to demodulate a different CDMA burst signal.

In this instance, the situation may sometimes arises where before the completion of the demodulation of a CDMA burst signal sent in the first time offset #1 of the current cycle, a CDMA burst signal is sent in the first time offset #1 of the next cycle. To immediately demodulate the CDMA burst signal sent later, it is necessary to provide one more demodulating part in addition to those equal in number to the time offsets used. That is, the number of time offsets +1, concretely, a total of five demodulating parts are provided.

On the one hand, in the case of adopting the structure of Embodiment 1 with a view to reducing the time needed until the completion of demodulation, two demodulating parts are required for each time offset; hence, a total of 10 demodulating parts is needed. This structure is strictly for the purposes of reduction of the demodulation time. However, this structure inevitably increases the scale of hardware, and hence it is not so preferable when it is desirable to simplify the system configuration as well.

On the other hand, ACK signals, which are answer signals to CDMA bust signals received in time offsets of a certain cycle, are sent from the base station 2 usually at the same time in an early one of the time offsets of the next cycle (for instance, in the first time offset #1). In this case, the ACK signals replying to the CDMA burst signals that are sent in the time offsets #1 to #3 can be sent in an early stage of the next cycle, but it is very difficult to send in such an early stage the ACK signal replying to the CDMA burst signal which is sent in the last time offset #4.

Accordingly, the transmission of all the ACK signals would be deferred unless the demodulation of the CDMA burst signal to be sent in the last time offset #4 is speeded up. In other words, the answer signals could be sent at predetermined timing by speeding up the demodulation of at least the CDMA burst signal which is sent in the last time offset #4. Hence, in Embodiment 3 the CDMA burst signal to be sent in the time offset #4 is demodulated in two demodulating parts as in the arrangement according to Embodiment 1 so as to simplify the hardware structure as well as prevent reduction of the circuit throughput.

Turning back to FIG. 7, the receiving part 9 according to Embodiment 3 has a total of six demodulating parts. Specifically, the receiving part 9 is provided with a first demodulating part 51, a second demodulating part 52, a third demodulating part 53, a fourth demodulating part 54, a fifth demodulating part 54 and a sixth demodulating part 56. The firs t to sixth demodulating parts 51 to 56 each has plural de-spreading parts and combining parts. Further, the receiving part 9 is provided with a time offset control part 57. The time offset control part 57 provides to the first to sixth demodulating parts 51 to 56 different mobile station information for each time offset.

Incidentally, in Embodiment 3 the first demodulating part 51 corresponds to second de-spreading means in claim 8, and the second to sixth demodulating parts 52 to 56 corresponds to first de-spreading means in claim 8.

The first to sixth demodulating parts 51 to 56 know in advance the time offsets allotted thereto, respectively. Specifically, the first demodulating part 51 is assigned the time offset #4 which is the last in one cycle. The second to sixth demodulating parts 52 to 56 are periodically assigned the time offsets #1 to #4. In this instance, one of the second to sixth demodulating parts 52 to 56 is assign ed t he first time offset #1 of the next cycle, and the other remaining ones are assigned the time offsets #1 to #4 of the current cycle.

In the receiving part 9 according to Embodiment 3 the timing detection part 12 is used in common to the plural time offsets. More specifically, the timing detection part 12 detects the de-spreading timing for each time offset. On the other hand, the time offsets that are assigned to the first to sixth demodulating parts 51 to 56 are known. Upon detecting the de-spreading timing, the timing detection part 12 assigns the detected de-spreading timing to the demodulating part that demodulates the CDMA burst signal of the corresponding time offset.

The first to sixth demodulating parts 51 to 56 each have a reference code generating part that generates a different reference code for each mobile station 2. The first to sixth demodulating parts 51 to 56 each specify the reference code to be generated, based on that one of the mobile station information from the time offset control part 57 which corresponds to the time offset assigned to demodulating part concerned. Thereafter, the first to sixth demodulating parts 51 to 56 each demodulate the CDMA burst signal, using the specified reference code.

In this case, the first demodulating part 51 demodulates the second-half burst of the CDMA burst signal that is sent in synchronization with the time offset #4. More specifically, provision is made to apply the CDMA burst signal directly to the first demodulating part 51. After assigned the de-spreading timing corresponding to the time offset allotted thereto, the first demodulating part 51 waits for the reception of the second-half burst of the CDMA burst signal. Further, the first demodulating part 51 generates a reference code corresponding to that one of the mobile station information sent from the time offset control part 57 which corresponds to the time offset #4. When supplied with the second-half burst, the first demodulating part 51 immediately demodulates it using the reference code generated as mentioned above.

As referred to above, one of the second to sixth demodulating parts 52 to 56 is assigned the fist time offset #1 of the next cycle and the rest assigned the time offsets #1 to #4 of the current cycle. For example, when the second to fifth demodulating parts 52 to 55 are assigned the time offsets #1 to #4 of the current cycle, respectively, the sixth demodulating part 56 is assigned the first time offset #1 of the next cycle. And after one cycle the second to fourth demodulating parts 52 to 54 are assigned the time offsets #2 to #4, respectively, and the fifth demodulating part 55 the first time offset #1 of the next cycle.

The second to sixth demodulating parts 52 to 56 demodulate CDMA signals sent in synchronization with any one of the time offsets #1 to #4. In this instance, when assigned the time offset #4, the demodulating part demodulates only the first-half burst of the CDMA signal, and when assigned the time offsets #1 to #3 other than #4, the demodulating part demodulates the CDMA signal from the beginning to the end thereof.

More specifically, the second to sixth demodulating parts 52 to 56 are each supplied with a CDMA burst signal delayed by the delay means 15 after being output from the receiving/demodulating part 11. In this case, the delay time of the delay means 15 is set to a value equal to the timing detection time as in Embodiments 1 and 2.

Further, the second to sixth demodulating parts 52 to 56 each specify the mobile station 2 corresponding to the assigned time offset contained in the mobile station information that is fed from the time offset control part 57, and causes the reference code generating part o generate the reference code corresponding to the specified mobile station 2. As a result, the second to sixth demodulating parts 52 to 56 can demodulate the CDMA burst signals that are sent in synchronization with the assigned time offsets.

When assigned the time offsets #1 to #3 except the last #4 in one cycle, the second to sixth demodulating parts 52 to 56 each demodulate the CDMA burst signal corresponding to the assigned time offset, from the beginning to the end of the signal. Specifically, the second to sixth demodulating parts 52 to 56 each use the reference code generated based on the above-mentioned mobile station information to demodulate the CDMA burst signal at the de-spreading timing corresponding to the time offset assigned to the demodulating part concerned.

And, when assigned the last time offset #4 of one cycle, the second to sixth demodulating parts 52 to 56 each demodulate only the first-half burst of the CDMA burst signal corresponding to the time offset #4. Specifically, the second to sixth demodulating parts 52 to 56 each use the reference code generated based on the mobile station information to demodulate the CDMA burst signal at the de-spreading timing corresponding to the time offset assigned to the demodulating part concerned.

The second-half burst of the CDMA burst signal corresponding to the time offset #4 is demodulated in the first demodulating part 51 as mentioned above. Accordingly, the first demodulating part 51 and any one of the second to sixth demodulating parts 52 to 56 correspond to the two demodulation systems in Embodiment 1.

The receiving part 9 is further provided with plural (five) selectors 62, 63, 64, 65 and 66. The selectors 62 to 66 have memories 62a, 63a, 64a, 65a and 66a, respectively. The selectors 62 to 66 each knows in advance the time offset that is assigned thereto.

The selectors 62 to 66 each operate in accordance with the time offset assigned thereto. Specifically, when assigned the time offsets other than the last time offset #4 in one cycle, the selectors 62 to 66 output intact the demodulated signals that are provided from the second to sixth demodulating parts 52 to 56. On the other hand, when assigned the last time offset #4 in one cycle, the selectors 62 to 66 store in the memories 62a to 66a the second half demodulated signal from the second to sixth demodulating parts 52 to 56 and the first-half demodulated signal from the first demodulating part 51.

The selectors 62 to 66 read out the first-half demodulated signals from the memories 62a to 66a and output them in succession to the first-half demodulated signals. In this way, a complete demodulated signal can be obtained.

In this case, too, it is a matter of course to use a high-speed clock for reading out the demodulated signals from the memories 62a to 66a.

Referring next to FIG. 8, the de-spreading process according to Embodiment 3 will be described in more detail. For example, four CDMA burst signals B1 to B4 that are sent in the time offsets #1 to #4 in the first cycle C1 are demodulated in the second to fifth demodulating parts 52 to 55, respectively. In this instance, as regards the CDMA burst signal that is sent in the time offset #4, its first-half burst is demodulated in the fifth demodulating part 55, while at the same time its first-half burst is demodulated in the first demodulating part 51.

Accordingly, the demodulation of the CDMA burst signal that is sent in the time offset #4 is completed in a shorter time than the demodulation of the CDMA burst signals in the other time offsets. Consequently, in the example of FIG. 8, the ACK signal replying to each CDMA burst signal that is received in the first cycle Cl can be sent to the mobile station 1 in synchronization with at least the time offset #3 of the second cycle C2. In the case where a CDMA signal B5 sent in the first time offset #1 of the second cycle C2 is received, the CDMA burst signal B5 is demodulated in the sixth demodulating part 56 which was not used in the first cycle C1. Accordingly, even if the demodulation of a CDMA burst signal B1 has not been completed, the demodulation of the CDMA burst signal can be started.

Moreover, CDMA burst signals B6, B7 and B8 which are sent in the time offsets #2 to #4 are demodulated in the second to fourth demodulating parts 52 to 54, respectively. And a CDMA burst signal B9, which is sent in the first time offset #1 of a third cycle C3, is demodulated in the fifth demodulating part 55 which was not used in the second cycle C2.

By repeating the same process as described above, it is possible to efficiently demodulate CDMA burst signals that are sent in different time offsets.

As described above, Embodiment 3 has a configuration in which in the case of receiving CDMA burst signals sent in different time offsets, the first-half/second-half bursts of only the CDMA burst signal sent in the last time offset $3 of one cycle are demodulated in parallel as in Embodiment 1.

Accordingly, the demodulation time of the whole CDMA burst signal received in one cycle can be reduced. Hence, the base station 2 can promptly send an ACK signal to the mobile station 1 in answer to the CDMA burst signal concerned. The circuit throughput can therefore be increased. As a result, the channel capacity of the CDMA mobile communication system can be increased. For this reason, the subscriber capacity of the CDMA mobile communication system can be increased.

In addition, the configuration according to Embodiment 1 for demodulating first-half/second-half bursts in parallel is used for only one time offset. Accordingly, the scale of hardware structure is smaller than in the case where the configuration according to Embodiment 1 is used for every time offset.

Further, the number of demodulating parts used is larger than the number of time offsets by one; one of them is used to demodulate the CDMA burst signal synchronized with the first time offset of the next cycle and the others are used to demodulate CDMA burst signals synchronized with plural time offsets of the current cycle.

Accordingly, the demodulation of the CDMA burst signal synchronized with the first time offset of the next cycle can be started without delay. It is possible, therefore, to further increase the circuit throughput as a whole. Hence, the channel capacity of the CDMA mobile communication system can be further increased. Consequently, the subscriber capacity of the CDMA mobile communication system can be further increased.

Other Embodiment

In the above, three embodiments of the present invention have been described. It is a matter of course, however, that the invention may be embodied in other forms. For example, in Embodiments 1 and 3, the CDMA burst signal is divided into halves, that is, the first-half and second-half bursts. It is also possible, however, that the portion of the CDMA burst signal from its beginning to the end of the timing detection time, for example, is handled as the first-half burst and the portion of the CDMA burst signal from the end of the timing detection time to the end of the signal as the second-half burst.

With such an arrangement, in the case of demodulating the second-half burst, there is no need of waiting for the reception of the second-half burst, besides the first-half burst is shorter than a half of the overall burst length. Accordingly, the demodulation time can be shortened as compared with those in the above-described embodiments.

It is also possible that the portion of the CDMA burst signal from any point after the end of the timing detection period to the end of the signal is handled as the second-half burst and that the portion of the CDMA burst signal from its beginning to the beginning of the second-half burst is handled as the first-half burst.

In this case, however, the effect of reduction of the demodulating time could be secured by setting the beginning of the second-half burst of the CDMA burst signal at a point before the end of the timing detection period. That is, the beginning of the second-half burst is set at some point between first timing corresponding to the end of the timing detection period and second timing going back from the end of the CDMA burst signal by the timing detection period, and the first-half burst is from the beginning of the CDMA burst signal to the beginning of the second-half burst set as mentioned above. With this arrangement, the CDMA burst signal demodulating time can be kept nearly equal to the overall burst length.

Moreover, in Embodiments 1 and 3 described above, the timing detection time is a known value. However, the timing detection may sometimes be made in a short time, for example, when the number of mobile stations 1 that communicate with the base station 2 is extremely small. In view of this, the CDMA demodulating apparatus may be configured based on the premise that the timing detection time varies. With such a configuration, too, the demodulating time can be shortened.

This configuration will be described in more detail. The timing detection part 12 detects timing, using symbols smaller in number than a quarter of the overall burst length, depending on a radio wave propagation environment. The timing detection part 12 detects timing through the use of symbols smaller in number than, for instance, ⅛ or ¹⁄₁₆ of the overall burst length.

And, the timing detection part 12 has a built-in time supervision part for supervising the timing detection time. Further, the delay means 15 is one that does not delay the CDMA burst signal by a fixed time interval but is triggered by the output from the time supervision part to output the stored CDMA burst signal. Moreover, the demodulating part that demodulates the first-half burst specifies its end based on the output from the time supervision part, and demodulates the delayed CDMA burst signal from its beginning to the specified end. The demodulating part that demodulates the second-half burst responds to the assignment of the de-spreading timing to demodulate the portion of the signal from at that point to the end.

Besides, in the above embodiments demodulates the CDMA burst signal after dividing it into two, that is, first-half and second half bursts. For example, if an increase in the scale of hardware is permissible, it is also possible to divide the CDMA burst signal into three or more and demodulate them in parallel in different demodulating parts.

Further, Embodiments 1 and 3 use the selectors 16 and 62 to 66 provided with the memories 16a and 62a to 66a, respectively. But it is also possible, for example, to adapt the selectors 16 and 62 to 66 to output the first-half demodulated signal and the second-half demodulated signal in real time and store each outputted demodulated signal in memories of a DSP. Moreover, respective demodulated signals may also be input directly in the memories of the DSP in parallel without using the selectors.

In this instance, if the DSP or the like is adapted so that the first-half demodulated signal is read out and the second-half demodulated signal is read out in succession to the former, a demodulated signal corresponding to the CDMA burst signal in its entirety could be obtained.

Further, Embodiment 3 uses an extra demodulating part to immediately demodulate the CDMA burst signal that is sent in synchronization with the first time offset of the next cycle. However, if the CDMA burst signal sent in synchronization with the first time offset of the next cycle could immediately be demodulated without using the extra demodulating part, the following configuration may be employed.

For example, the sixth demodulating part 66 is removed, in which case the second to fourth demodulating parts 52 to 54 are fixedly assigned the time offsets #2 to #4, respectively, and the first and fifth demodulating parts 51 and 55 are each assigned the time offset #4. In this instance, the first and fifth demodulating parts 51 and 55 correspond to first and second de-spreading means in claim 3, respectively, and the second to fourth demodulating parts 52 to 54 correspond to third de-spreading means in claim 3.

With the above configuration, the number of demodulating parts is smaller by one than in the case of Embodiment 3, permitting further simplification of the hardware structure.

Further, in the above embodiments the present invention has been described as being applied to the base station 2. But the present invention is easily applicable to the receiving part 7 of the mobile station 1 as well. That is, the receiving part 7 demodulates in parallel the first-half and second-half burst of the CDMA burst signal sent from the base station 1. Alternatively, the demodulation of the burst signal sent from the base station 2 by the receiving part 7 is performed by demodulating the second-half burst based on a low-speed clock and then by demodulating the first-half burst based on a high-speed clock.

The above configuration allows reduction of the demodulating time in the mobile station 1 during random access, in particular. Accordingly, it is possible to suppress a delay in the transmission of an ACL signal from the mobile station 1 to the base station 2. Hence, the circuit throughput can be increased.

It will be apparent that many modifications and variations may be effected without departing from the scope of the novel concepts of the present invention.

What is claimed is:

1. A CDMA demodulating apparatus for demodulating a CDMA burst signal sent by random access and containing communication control data, said apparatus comprising:

timing detection means which detects de-spreading timing of said CDMA burst signal based on a correlation value between said CDMA burst signal and a reference code;

delay means which delays said CDMA burst signal for at least a timing detection time configured to allow a detection of the de-spreading time by said timing detection means;

first de-spreading means which, at the de-spreading timing detected by said timing detection means, de-spreads a second-half portion of a CDMA burst signal not delayed by said delay means which begins after a lapse of said timing detection time, thereby generating a second-half demodulated signal;

second de-spreading means which, in parallel with the de-spreading by said first de-spreading means and at the de-spreading timing detected by said timing detection means, de-spreads a first-half portion of said CDMA burst signal delayed by said delay means which extends from the beginning of said CDMA burst signal to the beginning of said second-half portion, thereby generating a first-half demodulated signal; and reconstructing means which selects s aid first-half demodulated signal generated by said second de-spreading means and, upon completion of said selection, selects said second-half demodulated signal in succession to said first-half demodulated signal, thereby obtaining a demodulated signal corresponding to said CDMA burst signal in its entirety.

2. The CDMA demodulating apparatus of claim 1, wherein:

the overall burst length of said CDMA burst signal is a known length twice or more as long as said timing detection time;

said second-half portion is a portion from a midpoint of said CDMA burst signal to the end thereof;

said first-half portion is a portion from the beginning of said CDMA burst signal to said midpoint thereof; and said first de-spreading means is a means which, based on the de-spreading timing detected by said timing detection means, decides whether the time one half that of said overall burst length has passed, and when the time one half that of said overall burst length has passed, start de-spreading of said CDMA burst signal.

3. The CDMA demodulating apparatus of claim 1, wherein said reconstructing means: temporarily stores the second-half and first-half demodulated signals generated by said first and second de-spreading means, respectively; reads out and outputs the stored first-half demodulated signal; and upon completion of said output, reads out and outputs the second-half demodulated signal in succession to said first-half demodulated signal.

4. The CDMA demodulating apparatus of claim 1, wherein:

said CDMA burst signal is sent using any one of plural time offsets repeating in a predetermined cycle;

plural third de-spreading means are further provided whose number is smaller than the number of said time offsets by one and by which CDMA burst signals delayed by said delay means corresponding to CDMA burst signals sent using the time offsets except the last time offset of one cycle are respectively de-spread from their beginning to the end, thereby generating demodulated signal corresponding to the respective CDMA burst signals in their entirety; and said first and second de-spreading means respectively de-spread said second-half portion and said first-half portion of a CDMA burst signal sent using the last time offset of one cycle.

5. A CDMA demodulating apparatus for demodulating a CDMA burst signal sent by random access and containing communication control data, said apparatus comprising:

timing detection means which detects de-spreading timing of said CDMA burst signal based on a correlation value between said CDMA burst signal and a reference code;

delay means which delay s said CDMA burst signal;

de-spreading means which: de-spreads, by a first processing clock, a second-half portion of a CDMA burst signal not delayed by said delay means which begins after a lapse of said timing detection time, thereby generating a second-half demodulated signal; and after sa id de-spreading, de-spreads, by a second processing clock faster than said first processing clock, a first-half portion of said CDMA burst signal delayed by said delay means which extends from the beginning of said CDMA burst signal to the beginning of said second-half portion, thereby generating a first-half demodulated signal; and reconstructing means which selects said first-half demodulated signal generated by said de-spreading means and, upon completion of said selection, selects said second-half demodulated signal in success ion to said first-half demodulated signal, thereby obtaining a demodulated signal corresponding to said CDMA burst signal in its entirety.

6. The CDMA demodulating apparatus of claim 5, wherein said de-spreading means comprises:

first clock generating means which generates a first processing clock;

first de-spreading means which de-spreads the second-half portion of a CDMA burst signal not subjected to said delay, using said first processing clock generated by said first clock generating means;

second clock generating means which generates a second processing clock faster than said first processing clock after completion of the de-spreading by said first de-spreading means; and second de-spreading means which, upon generation of said second processing clock by said second clock generating means, de-spreads the first-half portion of said CDMA burst signal subjected to said delay, using said second processing clock.

7. The CDMA demodulating apparatus of claim 6, wherein said second de-spreading means: reads out said CDMA burst signal from said delay means, using said second processing clock generated by said second clock generating means; and de-spreads the first-half portion of said read-out CDMA burst signal, using said second processing clock.

8. A CDMA demodulating apparatus for demodulating a CDMA burst signal sent by random access using any one of plural time offsets repeating in a predetermined cycle and containing communication control data, said apparatus comprising:

timing detection means which detects de-spreading timing of said CDMA burst signal for each time offset, based on a correlation value between said CDMA burst signal and a reference code;

delay means which delays said CDMA burst signal for at least a timing detection time configured to allow a detection of the de-spreading time by said timing detection means;

first de-spreading means comprises:

means a number of which is larger than a number of said time offsets by one, which are each assigned time offsets in a repeating cyclic order, and which, when assigned other time offsets than a last one of one cycle, de-spread CDMA burst signals delayed by said delay means and corresponding to said assigned time offsets, using de-spreading timing detected by said timing detection means and corresponding to said assigned time offsets, thereby generating a demodulated signal corresponding to the whole CDMA burst signal; and means which, when assigned the last time offset of one cycle, de-spreads, at the de-spreading timing detected by said timing detection means and corresponding to said assigned time offset, a first-half portion of the CDMA burst signal delayed by said delay means and corresponding to said assigned time offset which extends from the beginning of said CDMA burst signal to at least a point after the lapse of timing detection time, thereby generating a first-half demodulated signal;

second de-spreading means which is assigned a last time offset of one cycle and, in parallel with the de-spreading by said first de-spreading means assigned the last time offset of one cycle and at the de-spreading timing detected by said timing detection means and corresponding to said assigned time offset, de-spreads a second-half portion of a CDMA burst signal not delayed by said delay means and corresponding to said assigned time offset which extends from the end of said first-half portion to the end of said CDMA burst signal, thereby generating a second-half demodulated signal; and plural reconstructing means each of which selects said first-half demodulated signal generated by said first de-spreading means and assigned the last time offset of one cycle, and upon completion of said selection, selects said second-half demodulated signal generated by said second de-spreading means, in succession to said first-half demodulated signal, thereby obtaining a demodulated signal corresponding to the CDMA burst signal in its entirety.

9. A CDMA mobile communication system which has two radio stations including a mobile station and in which a CDMA burst signal containing communication control data is sent from one of the two radio stations to the other radio station through random access, said system comprising:

said other radio station comprises: means for receiving the CDMA burst signal sent from said one radio station; and a CDMA demodulating apparatus for demodulating the received CDMA burst signal as recited in claim 1.

10. A CDMA mobile communication system which has two radio stations including a mobile station and in which a CDMA burst signal containing communication control data is sent from one of the two radio stations to the other radio station through random access, said system comprising:

said other radio station comprises: means for receiving the CDMA burst signal sent from said one radio station; and a CDMA demodulating apparatus for demodulating the received CDMA burst signal as recited in claim 5.

11. A CDMA demodulating method for demodulating a CDMA burst signal sent by random access and containing communication control data, said method comprising the steps of:

detecting a de-spreading timing of said CDMA burst signal based on a correlation value between said CDMA burst signal and a reference code;

delaying said CDMA burst signal for at least a timing detection time to detect the de-spreading time;

at the de-spreading timing detected by said timing detection means de-spreading by a first de-spreading means a second-half portion of a CDMA burst signal not delayed, thereby generating a second-half demodulated signal;

in parallel with said de-spreading by said first de-spreading means and at the detected de-spreading timing, de-spreading a first-half portion of said delayed CDMA burst signal by a second de-spreading means thereby generating a first-half demodulated signal;

selecting said first-half demodulated signal generated by said second de-spreading means and, upon completion of said selection;

selecting said second-half demodulated signal in succession to said first-half demodulated signal;

reconstructing a demodulated signal corresponding to said CDMA burst signal in its entirety.

12. A CDMA demodulating method for demodulating a CDMA burst signal sent by random access and containing communication control data, said method comprising the steps of:

detecting a de-spreading timing of said CDMA burst signal based on a correlation value between said CDMA burst signal and a reference code;

delaying said CDMA burst signal;

de-spreading by a first processing clock, an undelayed second-half portion of said CDMA burst signal, thereby generating a second-half demodulated signal; and after said de-spreading by a first processing clock, de-spreading by a second processing clock faster than said first processing clock a first-half portion of said delayed CDMA burst signal, thereby generating a first-half demodulated signal;

selecting said first-half demodulated signal;

selecting said second-half demodulated signal in succession to said first-half demodulated signal; and reconstructing a demodulated signal corresponding to said CDMA burst signal in its entirety.

* * * * *